May 8, 1945.  W. E. BROWN  2,375,193

GENERATOR REGULATING SYSTEM

Filed Oct. 11, 1943

INVENTOR
William Earl Brown
BY
Spencer, Hardman & Fehr
his ATTORNEYS

Patented May 8, 1945

2,375,193

UNITED STATES PATENT OFFICE 2,375,193

GENERATOR REGULATING SYSTEM

William Earl Brown, Anderson, Ind., assignor to General Motors Corporation, Detroit, Mich., a corporation of Delaware Application October 11, 1943, Serial No. 505,733

5 Claims. (Cl. 320—12)

This invention relates to regulating means for generators by which the useful output of the generator is controlled. More particularly the present invention relates to a resistance control comprising a bleeder circuit including a resistance normally connected across the terminals of the generator and a resistance in series with the generator field circuit.

An object of the present invention is to provide switching means for including or removing the resistance units to control the useful output of the generator. In the disclosed embodiment of the invention this object is accomplished by manual manipulation of switching means. In this connection all resistances are connected in their respective circuits in the normal position of the switching means so that the useful output of the generator is limited to a low value. In the normal position of the switching means a load, such as lights controlled by another switch, are off. There are times when the battery is partly discharged and no load is needed, except for ignition, it is most desirable to have the useful output increased in order to bring the battery to its fully charged condition, thus by manual operation of the switching means to an intermediate position thereof the useful output of the generator is raised by open-circuiting the bleeder circuit so that the current to the battery is increased. When a load is connected across the battery the switch is actuated to a position to raise the useful output of the generator still further in that the bleeder circuit remains open-circuited and the field resistance is shunted.

Another object of the present invention is to provide switching means which is associated with a lighting switch, said lighting switch, for example, having two "off" positions and an "on" position. Thus, a three-step control is provided to connect or remove the resistance units. Accordingly the switch controlling the resistance units is actuated simultaneously with the lighting switch. The arrangement of the above referred to switches is such that when the lighting switch is in its normal "off" position all resistance units are connected in their respective circuits and when the light switch is in its second "off" position the other switch removes one of the resistance units from its circuit but when the lighting switch is in its "on" position the other switch is in position to shunt the second resistance unit.

Another object of the present invention is to provide a battery charging system wherein the battery floats on the line when the battery is fully charged, the generator supplying the load current.

Further objects and advantages of the present invention will be apparent from the following description, reference being had to the accompanying drawing wherein a preferred embodiment of the present invention is clearly shown.

Figure 1:
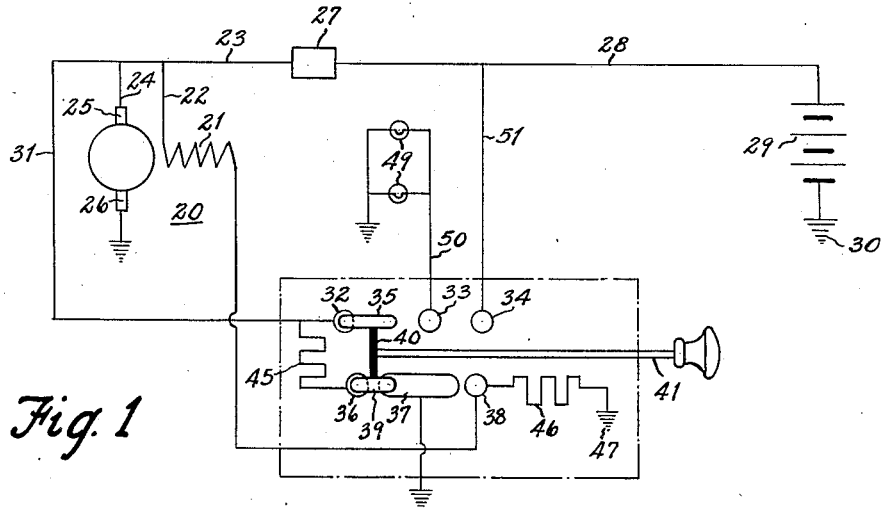
Fig. 1 is a wiring diagram illustrating the various elements and their electrical connections which comprise one embodiment of the preferred form of the present invention in its normal position.

Referring to Fig. 1 a generator 20 is provided with a shunt winding 21 connected at one end with a stationary contact of a switch assembly grounded through a resistance unit 46 and by a wire 22 to an output lead 23. The lead 23 is connected by a wire 24 to the positive brush 25 to the generator. The negative brush 26 of the generator is grounded. The lead 24 is connected to a cut-out relay 27 which in turn is connected by a lead 28 to the positive terminal of the storage battery 29 grounded at 30. The positive brush 25 is also connected to a bleeder circuit including a lead 31 attached to a resistance unit 45. One end of the resistance 45 is connected to a stationary contact 32 while the other end is connected to a stationary contact 36 of a switch assembly.

The switch assembly in the present instance comprises two switches, one of the switches including stationary contacts 32, 33 and 34 and a bridging member or movable contact 35 while the second switch comprises stationary contacts 36, 37 and 38 and a bridging member or movable contact 39. The movable contacts 35 and 39 are connected together, so that they will move together, by a bar 40 of insulating material. The bar is actuated by a lever or actuator 41.

The resistance 45 is connected in the bleeder circuit when the switches are in their normal position. A load or other current consuming device 49 is connected to the contact 33 by a wire 50 and the contact 34 is connected with the lead 28 by a wire 51.

Figure 2:
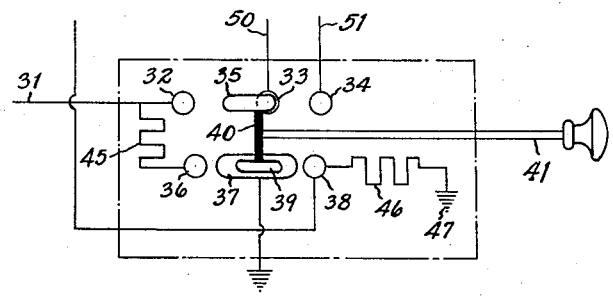
Figs. 2 and 3 are views similar to Fig. 1 showing the different electrical connection when a manual switching means is actuated to different positions.

The operation of the charging system is as follows: When the actuator 41 is in the position shown in Fig. 1 and the generator is operating the bleeder circuit including the resistance element of unit 45 is connected in a circuit by wire 31, contacts 32, 36, movable contact 39, stationary contact 37 which is grounded. The field winding circuit is completed through the resistance 46 which is grounded at 47. By the inclusion of both resistances 45 and 46 in circuits the useful output of the generator is limited to a low value. When the actuator 41 of the lighting switch is moved to the position shown in Fig. 2, the bleeder circuit 45 is cut out so that the useful output of the generator is raised thereby the current flow to the battery is increased.

Figure 3:
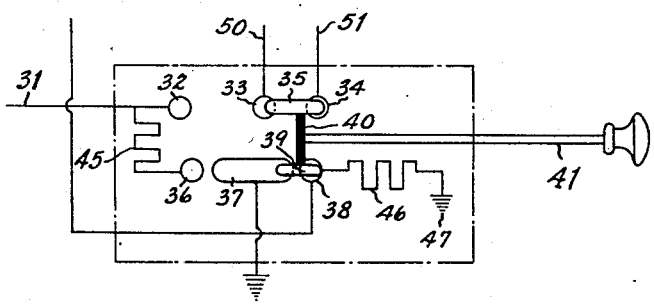

When the actuator is moved to the position shown in Fig. 3 the useful output of the generator is raised still further in that the bleeder circuit is still cut out and the resistance 46 is shunted due to the fact the movable contact 39 will bridge contacts 37 and 38 and the field circuit is completed through contacts 38, 39 and 37. The contact 37 is grounded. Since both movable contacts 35 and 39 move simultaneously the movable contact 35 will bridge contacts 33, 34 to connect a load across the battery. When the contact 39 bridges contacts 37 and 38 to shunt the resistance 46 the system will operate at a high charging rate.

The advantages of the present invention are that the battery is never charged at a voltage which will be injurious to the battery and the battery is used only to supply the load when the generator is not operating, the battery floating on the line at other times with the generator supplying the full load current.

While the embodiment of the present invention as herein disclosed, constitutes a preferred form, it is to be understood that other forms might be adopted, all coming within the scope of the claims which follow.

What is claimed is as follows:

1. A storage battery charging system comprising in combination; a storage battery; a battery charging generator having its field coil; a resistance unit in series with the field coil; a second resistance unit connected in parallel with the generator; a switch for normally connecting both resistance units in circuits to reduce the charging rate of the generator to a low value, said switch being operable to a position to cut out the second mentioned resistance from its circuit so as to increase the charging rate of the generator to a medium value, and said switch being operable to a second position to shunt the field resistance so as to increase the charging rate of the generator to a high value; and a second switch movable with the first switch for connecting a load across the battery when the first switch is in the position to shunt the field resistance, said load being connected across the battery as long as the field resistance is shunted by the first switch.

2. In combination; a generator with its field; a battery connected with the generator and adapted to be charged thereby; a plurality of separate resistance units arranged in different circuits for regulating the charging rate of the generator; switching means having a first position for normally connecting all of the resistance units in their respective circuits causing the generator to produce a low charging rate, and having a second position to disconnect one of the resistance units from its circuit causing the generator to increase its charging rate to a moderate value, and having a third position for shunting the remaining resistance units causing the generator to increase its charging rate to a high value; and switching means associated with the first mentioned switch for connecting a load across the battery when the first switch is in its third position.

3. In combination; a generator and its field coil; a battery connected with the generator and adapted to be charged thereby; a plurality of resistance units for regulating the charging rate of the generator, one of said resistance units being in series with the field coil; a load adapted to be connected across the battery; and a switch having an actuating member movable into a plurality of positions and controlling two different groups of contacts simultaneously, each group including a plurality of stationary contacts and a movable contact, said movable contacts being arranged so that another resistance unit is connected in parallel with the generator in the normal position of the actuating member so that the charging rate of the generator is reduced to low value, said movable contacts disconnecting the second mentioned unit in another position of the operating member so as to increase the charging rate of the generator, and one of said movable contacts shunting the field resistance unit in still another position of the switch to increase further the charging rate of the generator, while the other movable contact connects the load across the battery in the last mentioned position of the operating member.

4. In combination, a generator having a field coil; a battery connected with the generator and adapted to be charged thereby; a pair of resistance units for regulating the output of the generator, one of said units being in series with the field coil while the other unit is capable of being connected in parallel with the generator; a pair of switches cooperating in their normal position for connecting the other resistance unit in a circuit so that the output of the generator will be of a low value; means for actuating the switches from their normal position to one position to remove the second mentioned resistance from its circuit to increase the output of the generator and to another position whereby one of the switches will connect a load across the battery while the other switch will shunt the field resistance and thereby cause the output of the generator to be increased to its maximum value.

5. In combination, a generator having a field coil; a battery connected with the generator and adapted to be charged thereby; a load adapted to be connected across the battery; a resistance in series with the field; a second resistance unit connected with one of the terminals of the generator; a switch for normally connecting the second resistance in parallel with the generator; and means for actuating the switch to one position to remove only the second resistance from its circuit and into another position to shunt the field resistance and simultaneously connect the load across the battery.

WILLIAM EARL BROWN.